Patented Dec. 15, 1925.

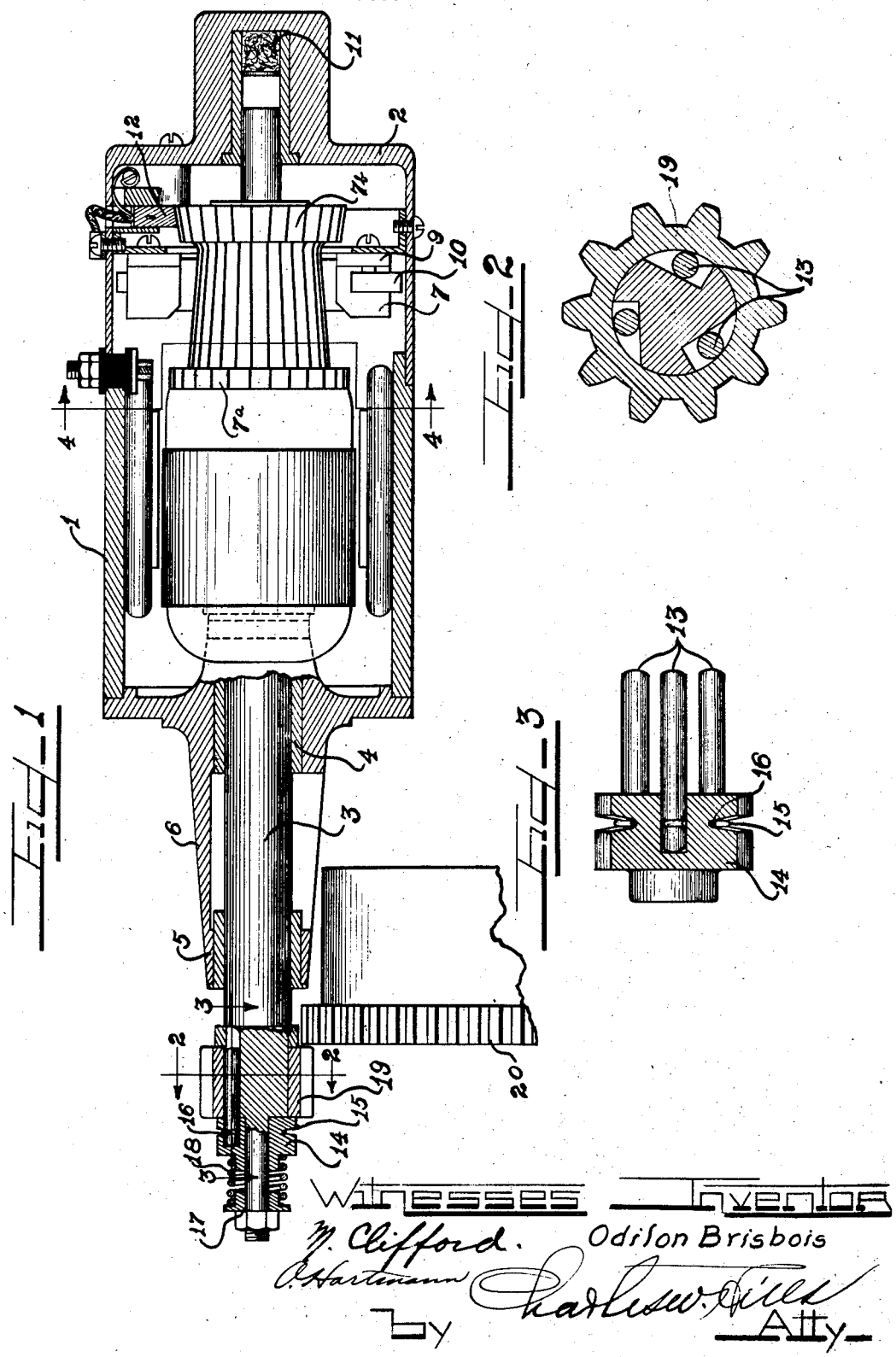

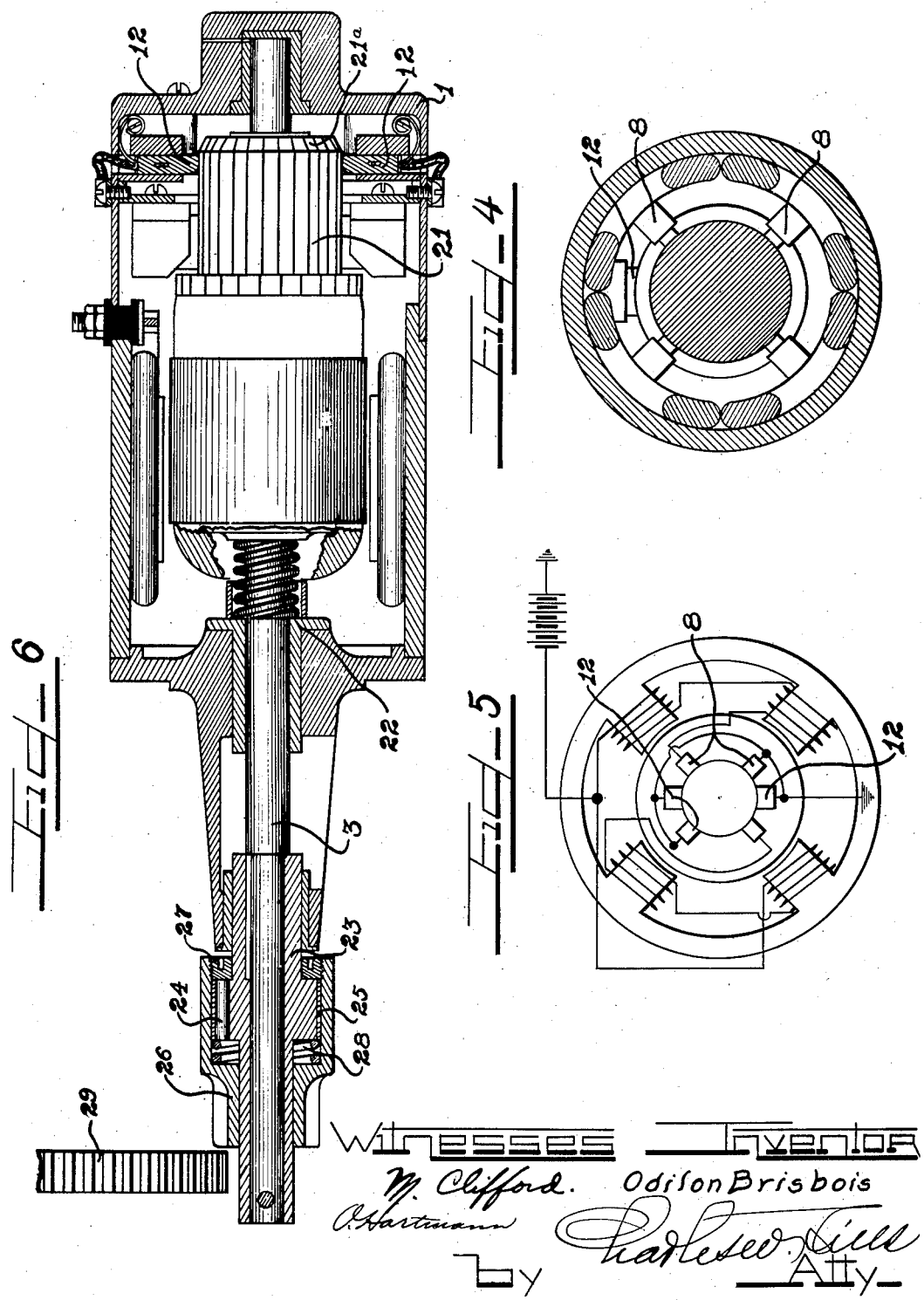

1,565,252

UNITED STATES PATENT OFFICE.

ODILON BRISBOIS, OF CHICAGO, ILLINOIS.

STARTING MOTOR FOR AUTOMOBILES.

Application filed December 11, 1922. Serial No. 606,343.

*To all whom it may concern:*

Be it known that I, ODILON BRISBOIS, a citizen of the United States, and a resident of the city of Chicago, in the county of Cook and State of Illinois, have invented certain new and useful Improvements in a Starting Motor for Automobiles; and I do hereby declare that the following is a full, clear, and exact description of the same, reference being had to the accompanying drawings, and to the numerals of reference marked thereon, which form a part of this specification.

This invention relates to starting motors for automobiles of that type in which the magnetic flux of the motor is utilized to bring a pair of gears into meshing relation.

In the past, various schemes have been devised for slowing down the speed of rotation of the motor during the period when the motor shaft is moving longitudinally for bringing the gears into meshing relation. Most of these schemes involved expensive mechanism and proved unsatisfactory.

According to this invention, it is proposed to use a tapered commutator in combination with one or more auxiliary brushes for shunting or cutting out a number of coils in the armature for decreasing the initial rotation of the armature. It is further proposed to utilize the yielding wedging action between the tapered commutator and the main brushes for normally shifting the armature from its centered position in the field, thereby avoiding the resistance of the usual stiff end spring.

It is contemplated to use an automatic one-way clutch for connecting the gear with the motor shaft that allows a free spinning of the gear when the motor is started and that yields upon a back kick of the engine.

With these and other purposes in view, which will become more apparent in the following description and disclosure, this invention comprises the novel mechanism and combinations hereinafter described and more particularly pointed out and defined in the approved claims.

In the accompanying drawings, which illustrate certain embodiments of this invention, and in which similar reference numerals refer to similar features in the different views:

Figure 1 is a longitudinal section through a starting motor involving this invention.

Figure 2 is a section on the line 2—2 of Figure 1.

Figure 3 is a section on the line 3—3 of Figure 1.

Figure 4 is a section on the line 4—4 of Figure 1.

Figure 5 is a diagrammatic view of the wiring of the field of the motor and commutator brushes.

Figure 6 is a longitudinal section of a modified form of this invention.

As shown on the drawings:

In referring to Figs. 1 to 5 of the drawing, the reference numeral 1 denotes a motor casing provided with a shaft bearing socket 2 in its rear end. The armature shaft 3 has its rear end slidably supported in the socket 2 and its forward end is journalled in bearings 4 and 5 of the forward extension 6 of the casing. The commutator 7 consists of a circular series of insulated bars having a forward cylindrical ridge $7^a$ and a rear upwardly sloping enlargement or ridge $7^b$ with an intermediate portion that tapers or slopes upwardly in a forward direction from the bottom of the rear ridge $7^b$.

The main brushes 8 are slidingly supported in sockets or the like formed in an annular frame 9 secured interiorly of the casing 1. The lower ends of the brushes are preferably tapered to correspond with the taper of the commutator. The usual springs 10 that force the brushes into contact with the commutator have sufficient force to normally shift the armature shaft forwardly of its field through the slipping wedging action between the brushes and the commutator. A cushion 11 is positioned in the rear end of the socket 2 to absorb any shock or impact of the armature shaft.

The auxiliary brush 12 is positioned between a pair of the main brushes 8 and is connected with the main negative or ground brushes, as shown in Fig. 5. This arrangement will short circuit or cut out the armature coils between the auxiliary brush and one of the adjacent main brushes, as is obvious, whereby the rotative effect of the armature is decreased. In Fig. 5, which shows how two auxiliary brushes may be used, the armature coils between the auxiliary brushes 12 and the adjacent main brushes 8 traveling in an anti-clockwise direction around the commutator will be cut out of service.

The forward end of the motor shaft is slightly reduced, and provided with recesses as shown in Fig. 2 for receiving clutching rollers 13. The construction of the recesses is such that the contacting points of the rollers lie in a chord of the circumference of the rollers. A length of chord is selected that will produce a yielding wedging action for abnormal loads as arise from a back-kick of the engine. The forward ends of the rollers are mounted in cylindrical apertures in a circular carrier or hub 14 which fits over a further reduced end of the motor shaft and is slidably mounted thereon. A V-shaped groove 15 is cut in the periphery of the carrier 14 and communicates with the cylindrical apertures, and the rollers 13 are provided with small grooves that lie in the place of the V-shaped groove of the carrier for receiving a binding element 16 in the form of a wire or the like that is wound around the carrier 14 in the groove thereof. A nut 17 on the end of the motor shaft forms an abutment for a coil spring 18 that bears against the end of the carrier. A driving member 19 in the form of a small gear or pinion is mounted over the clutch rollers and is adapted to be brought into co-acting relation with an engine member 20 in the form of a gear on the fly wheel of an engine. The outer end of the driving member or gear 19 abuts the end of carrier 14 so that if there is a tooth-on-tooth engagement of the gears when they are brought into mesh, the gear 19 and carrier 14 will yield longitudinally against the tension of the spring 18. The roller carrier 14 acts as a controller for the rollers, and serves to bring them simultaneously into wedging action. The gear 19 is supported thereon, and must necessarily grip all the rollers simultaneously and when there is a yield upon back-fire, the disengagement of the rollers will be simultaneous, as is obvious.

In Fig. 1, the motor is shown in its normal inoperative position with the armature shifted forward of its field, and the auxiliary brush 12 contacting with the rear ridge 7$^b$ of the commutator. If current is now turned on, the magnetic force of the motor acting as a solenoid will draw the armature inwardly and bring the gears 19 and 20 into meshing relation. During such inward travel of the armature, the brush 12 will be effective for rendering idle or cutting out a number of armature coils, whereby a slow rotation of the armature results, but as soon as the gears are substantially in mesh, the ridge 7$^b$ will have been shifted rearwardly from under the brush 12, whereby all the armature coils are brought into action for supplying sufficient torque for starting the engine. As soon as the engine has started, the main starting switch may be opened to stop the motor. As soon as the current has been thuswise cut off, the yielding pressure of the main commutator brushes acting upon the tapered commutator will shift the same forwardly, the ridge 7$^b$ riding under the auxiliary brush 12 during such forward movement.

In Fig. 6 is illustrated a slight modified form of motor in which two auxiliary brushes are shown which are so connected in the motor circuit as to cut out two different sets of armature coils, and the arrangement is such that the armature shaft is shifted forwardly for the purpose of meshing the gears instead of being shifted rearwardly as in the preferred form.

In this modified form, the commutator 21 is provided with a rear beveled edge 21$^a$ and the two auxiliary brushes 12 are adapted to ride down and up the bevel during the longitudinal shifting of the armature. In this case, the armature is normally shifted rearwardly of its field by a spring 22 confined between the forward end of the armature and the motor casing 1. The forward end of the motor shaft is provided with a sleeve 23 keyed thereon. The sleeve has an intermediate hub in which roller recesses are cut for receiving rollers 24. A split ring 25 surrounds the rollers and a gear or pinion 26 is journalled upon the sleeve and provided with a rear hollow hub that fits over the split ring. An annular ring 27 is threaded into the rear end of the hollow hub and co-operates with the sleeve hub to limit the relative forward movement of the gear. A coil spring 28 is positioned within the hollow hub between the gear and the hub on the sleeve so that the gear may have a slight longitudinal yield in case there is a tooth-on-tooth engagement of the gears. The gear 26 is adapted to be brought into meshing relation with a gear 29 constituting a member on the shaft of an internal combustion engine which it is desired to start.

The construction of the roller recesses is such that the rollers 24 contact upon points of tangency of two converging tangents which approximate yieldable inclination so that the clutching connection will be broken upon an abnormal load such as arises from a "back-kick" of the engine. The slip ring 25 is provided for producing an initial yield to minimize the clashing of the gears during the starting operation.

In starting the motor, the usual starting switch is operated for connecting the motor with the source of energy. The magnetic force will shift the armature forward to bring the gears 26 and 29 into mesh. During such shifting movement of the armature, the auxiliary brushes 12 will be effective for cutting out a number of armature coils whereby a slow rotation will be imparted to the armature. When meshing of the gears occurs, the commutator will have passed sufficiently forward and out of contact with the auxiliary brushes 12 to bring thereby the total coils of the armature into action for increasing the torque of the motor for starting the engine. When the engine has been started, the starting switch is opened, allowing the spring 22 to shift the armature rearwardly of its field into the position shown in Fig. 6, the auxiliary brushes riding up the beveled surface of the commutator, as is obvious.

According to the foregoing, it will be apparent that I have invented an improved starter in which a slow rotation of the armature is obtained during the longitudinal travel thereof and which automatically increases in speed at the end of such longitudinal travel. While I am aware that attempts have been made to initially reduce the speed of rotation of the armature by cuttting out a number of armature coils, I know of no starter embodying the structural features of this invention.

I am aware that numerous details of construction may be varied through a wide range without departing from the principles of this invention, and I therefore do not purpose limiting the patent granted otherwise than necessitated by the prior art.

I claim as my invention:

1. In a starting motor, a longitudinally shiftable armature, a tapered commutator having a rear beveled ridge, an auxiliary brush normally contacting with said ridge and so connected in circuit with the motor as to cut out a number of armature coils, said commutator riding from under said brush during its longitudinal travel.

2. The combination with an engine member, of a starting motor therefor having a normally displaced armature, a tapered commutator for the armature, brushes coacting with said commutator and effective for normally shifting said armature into its displaced position.

3. In an engine starting motor, a longitudinally shiftable armature, a commutator therefor having a beveled edge, an auxiliary brush co-operating with said commutator and adapted for riding down said beveled edge out of contact with said commutator during a shifting movement of the armature.

4. In an engine starting motor, a longitudinally shiftable armature having a tapered commutator, and means coacting with said tapered commutator for normally shifting said armature.

5. The combination with an engine member, of a starting motor therefor having a normally displaced armature, a tapered commutator carried by the armature, brushes co-acting with said commutator and effective for normally shifting said armature to its displaced position and a pinion mounted upon said armature shaft for relative longitudinal and rotary movement for engagement with said engine member.

6. The combination with an engine member, of a starting motor therefor, having a normally displaced armature with an extended shaft, a tapered commutator carried by the armature, brushes co-acting with said commutator and effective for normally shifting said armature to its displaced position and a pinion mounted upon said armature shaft, a roller clutch interposed between said pinion and shaft and means providing a longitudinal yield for said clutch and pinion.

7. The combination with an engine member of a starting motor therefor having a shiftable shaft, a tapered member on said shaft and means coacting with said tapered member for shifting said shaft in a direction away from said engine member.

In testimony whereof I have hereunto subscribed my name.

ODILON BRISBOIS.